(No Model.)
A. W. ENGEL.
RING GAGE.
No. 458,564.  Patented Sept. 1, 1891.
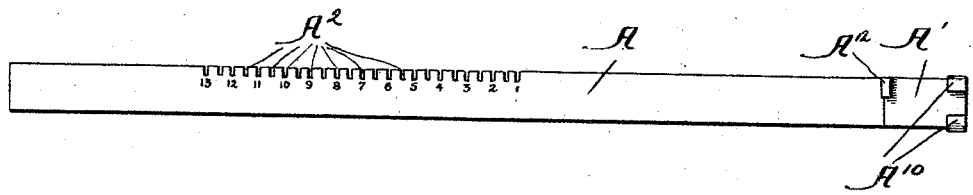
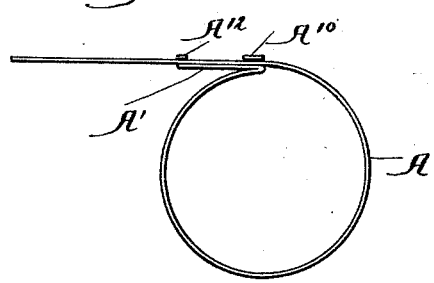
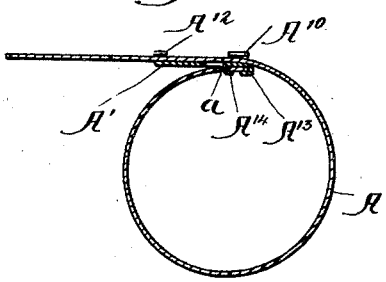
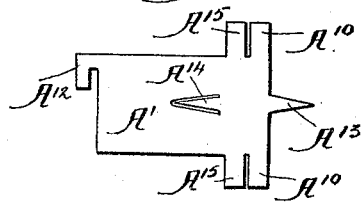
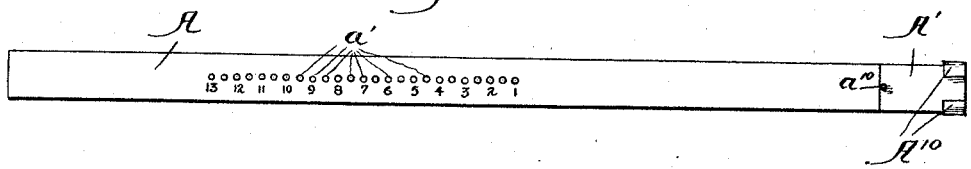
Witnesses:
Jean Elliott
Celeste P. Chapman
Inventor:
Albert W. Engel
By Burton & Burton
Attorneys

UNITED STATES PATENT OFFICE.

ALBERT W. ENGEL, OF CHICAGO, ILLINOIS.

RING-GAGE.

SPECIFICATION forming part of Letters Patent No. 458,564, dated September 1, 1891.

Application filed October 31, 1890. Serial No. 369,956. (No model.)

*To all whom it may concern:*

Be it known that I, ALBERT W. ENGEL, a citizen of the United States, residing at Chicago, county of Cook, and State of Illinois, have invented certain new and useful Improvements in Ring-Gages, which are fully set forth in the following specification, reference being had to the accompanying drawings, forming a part thereof.

In the drawings, Figure 1 is a plan of my improved ring-gage stretched out flat. Fig. 2 is a side elevation of the same coiled as in use. Both these figures represent the gage as made of one piece. Fig. 3 is a sectional elevation showing the gage made of two pieces, the main portion being of celluloid or similar flexible spring substance, non-metallic, and the terminal piece having the devices for fastening, being made of metal secured to the celluloid part. In this view the section is made through the junction of the two pieces to show the mode of fastening. Fig. 4 is a detail plan of the metallic clip. Fig. 5 is a plan of a modification employing holes instead of edge notches and a correspondingly-changed projection to engage the holes.

This invention is an improvement on a device for the same purpose for which Patent No. 436,972 was granted to me September 23, 1890.

The improvement consists in forming the fastening devices upon a terminal portion of the gage which extends back from one end and outside of the portion which is coiled about the finger, so that said terminal fastening is not coiled with the rest of the gage; but when the tape forming the gage is wrapped about the finger, said terminal portion extends at a tangent from one end, and the other end of the tape therefore may similarly extend upon said tangential terminal and be engaged by the fastening devices thereon. The advantage of this construction over that shown in my said former patent is, first, that the double thickness of the material throughout the extent that it laps in order to effect the fastening or bring the indicating-point into the notch is avoided, and thereby more accurate measurement obtained, and, second, that the scale is much more easily applied to the finger because of the fact that there is no necessity for curving the terminal portion. This terminal portion is almost necessarily made of metal, in order that it may be provided with the fastening devices, and I have found that more flexible substance than any metal tape which has the requisite thickness for necessary strength is desirable, in order that it may be readily wrapped in so small a coil as is necessary for taking measurements for small rings, and in order to employ such other flexible material and provide it with the metal terminal to receive the fastening devices it is essential that such metal terminal be not bent in the short curve which is necessary for small measurements, because its stiffness being so much greater than the more flexible material of the remainder of the gage will prevent it from being thus bent or coiled by the ordinary movement of wrapping the gage formed of such more flexible material about the finger, and in consequence the body of the gage of such material would be liable to be bent sharply and broken off at the end of the metal terminal if said terminal were secured throughout the whole of its necessary length on the surface of the other material. This change of construction, therefore, has special merit and importance in view of the further feature presented in Figs. 3, 4, and 5, which consists in the employment of tape of celluloid or other non-metallic flexible springy substance for the body of the gage or scale and a metallic terminal secured to the celluloid tape at one end and projecting back on the outer surface of the tape the necessary distance for the fastenings.

I will now describe the construction in detail, including in the description the features shown in the former patent as well as those which are new.

A is the body or tape forming the gage. A' is the terminal of such tape, which when the tape is wholly metallic may be made by folding back one end of it onto the outer surface. This is the construction shown in Figs. 1 and 2. When the body of tape is made of celluloid or other non-metallic substance, the terminal A' is laid upon the body A at one end and secured to such body by suitable means just as near the end as possible, being bound to it for the shortest possible distance consistent with making a secure connection, the remainder of the terminal beyond the mere point of fastening being free from the body of the tape, so that the latter may be curved when wrapped about the finger without curving the terminal A', which will therefore remain projecting tangentially with respect to the curved body. The terminal A' has the clasp-hooks A¹⁰ A¹⁰ folded from its opposite edges at the base end of said terminal—that is, the end at which it is made fast to the body, whether by being folded back upon it, as when it is one piece with the body, or being riveted thereto when it is a separate piece. These clasp-hooks are the same as similar hooks shown in my former patent, and serve a similar purpose—viz., to receive under and between them the tape when it is coiled in use. The free end of the terminal A' has the hook A¹², which I prefer to form, as illustrated, by bending up a lip at the end of the terminal, so that it stands at right angles to the outer upper surface, and then undercutting such lip from one side nearly to the other side, leaving only enough metal for strength, so that the hook will overhang the edge of the tape, which may be inserted under it in such under-cut, and the uncut-away portion of the hook will enter the notches A² A², which are made in the edge of the tape and numbered to correspond to a standard scale for measurement for finger-rings. In respect to these notches and the scale indicated by the numerals marked adjacent thereto the construction is the same as that described in my said former patent. When the terminal A is made in a separate piece from the body of the tape A, I secure it to the tape by making in the latter a small eyelet-hole $a$, forming on the end of the terminal midway between its two edges a little projecting tooth A¹³ and, striking down from the body of the terminal a little distance back from the end in a position corresponding to that of the eyelet-hole $a$ in the tape, a slender tooth A¹⁴, which when the terminal is applied on the tape will pass through the eyelet. The tooth A¹³ and the tooth A¹⁴ will then be folded down onto the under surface of the tape and made to clasp it firmly. Usually this will afford sufficient fastening. If more is needed, I form, in addition to the clasp-hooks A¹⁰, similar clasp-hooks A¹⁵ immediately adjacent to the former and fold them down on the opposite side from that on which the clasp-hoops A¹⁰ are folded, and cause them thereby to clasp the edges of the tape in the same manner as the end is clasped by the hook A¹². It may be preferred in some instances to employ the construction shown in Fig. 5, wherein small holes $a'$ are employed instead of the edge notches, and a mere pin projection $a^{10}$ is provided to enter said holes to engage the tape, instead of the undercut and overhanging hook A¹², which is specially adapted for use with the notches; but apertures of one form or the other and a projection of one form or the other adapted to enter the aperture are the essential means of effecting engagement at the joint on the graduated scale where the numeral denoting size is found.

I claim—

1. A ring gage or device for measuring for finger-rings, consisting of a flexible spring-tape provided with the terminal A', joined to it for a very short distance at one end and extending back a farther distance upon the body of the tape unconnected thereto, said terminal having a projection and the body of the tape having apertures adapted to receive said projection, substantially as and for the purpose set forth.

2. A ring-gage consisting of a flexible non-metallic tape having apertures corresponding to a scale for measurement of finger-rings, and a metallic terminal secured to the said non-metallic tape for a very short distance at one end of each of said parts and extending back from said point of fastening over the tape and provided with a projection to engage the apertures of the body of the tape, substantially as set forth.

3. A ring-gage consisting of a flexible non-metallic spring-tape having apertures and on one surface numerals opposite said apertures corresponding to a scale for the measurement of finger-rings, and a non-metallic terminal provided with projections folded to clasp the non-metallic tape at and very near the end only and thereby made fast to such tape and extending back over the tape a farther distance unconnected thereto and provided with a projection to engage the apertures, substantially as set forth.

4. A ring-gage consisting of a flexible non-metallic spring-tape having apertures corresponding to a scale for measurement of finger-rings, and a metallic terminal secured to such tape at and very near the end thereof only and extending back a short distance over the body of the tape unconnected thereto, and having the clasp-hooks A¹³ at the end which is connected to the tape, and having a projection at the free end adapted to engage the apertures, substantially as set forth.

5. A ring-gage consisting of a flexible non-metallic spring-tape having notches on one edge corresponding to a scale for measurement of finger-rings, and a metallic terminal secured to such tape at and very near the end thereof only and extending back a short distance over the body of the tape unconnected thereto, and having the clasp-hooks A¹³ at the end which is connected to the tape, and having near the free end the hook A¹², undercut to receive the edge of the tape and adapted to enter its notches, substantially as set forth.

In testimony whereof I have hereunto set my hand, at Chicago, Illinois, in the presence of two witnesses, this 25th day of October, 1890.

ALBERT W. ENGEL.

Witnesses:
CHAS. S. BURTON,
JEAN ELLIOTT.